US011207796B2

(12) United States Patent
Barnes

(10) Patent No.: US 11,207,796 B2
(45) Date of Patent: Dec. 28, 2021

(54) CUTTING BELT WITH A PLURALITY OF CABLE SEGMENTS

(71) Applicant: WF Meyers Company Inc., Bedford, IN (US)

(72) Inventor: Alexander Barnes, Bedford, IN (US)

(*) Notice: Subject to any disclaimer, the term of this patent is extended or adjusted under 35 U.S.C. 154(b) by 408 days.

(21) Appl. No.: 15/871,251

(22) Filed: Jan. 15, 2018

(65) Prior Publication Data

US 2018/0215073 A1    Aug. 2, 2018

Related U.S. Application Data

(60) Provisional application No. 62/452,552, filed on Jan. 31, 2017.

(51) Int. Cl.
*B23D 61/18* (2006.01)
*B27B 17/02* (2006.01)
*B28D 1/08* (2006.01)
*B28D 1/12* (2006.01)

(52) U.S. Cl.
CPC .......... *B28D 1/124* (2013.01); *B23D 61/185* (2013.01); *B27B 17/02* (2013.01); *B28D 1/08* (2013.01)

(58) Field of Classification Search
CPC ........ B28D 61/185; B28D 1/08; B28D 1/086; B28D 1/124
USPC ............. 125/21; 198/846; 29/76.3; 451/296; 474/260, 261
See application file for complete search history.

(56) References Cited

U.S. PATENT DOCUMENTS

| 2,444,583 | A | * | 7/1948 | Stewart | F16G 5/08 474/262 |
| 2,779,149 | A | * | 1/1957 | Schuller | D07B 1/0673 57/214 |
| 3,808,901 | A | * | 5/1974 | Berg | F16G 5/166 474/242 |
| 4,283,184 | A | * | 8/1981 | Berg | F16G 1/28 198/834 |
| 4,603,678 | A |   | 8/1986 | Fish |  |
| 4,679,541 | A | * | 7/1987 | Fish | B28D 1/084 125/21 |
| 4,945,889 | A | * | 8/1990 | Fish | B28D 1/088 125/21 |

(Continued)

FOREIGN PATENT DOCUMENTS

| DE | 10052213 A1 | * | 5/2002 | ............. B65G 15/36 |
| JP |  3108511 A | * | 5/1991 | ............... B28D 1/08 |

OTHER PUBLICATIONS http://pythonrope.com/wireropes, from Python Technical Information.

*Primary Examiner* — Joseph J Hail
*Assistant Examiner* — Arman Milanian
(74) *Attorney, Agent, or Firm* — Woodard, Emhardt, Henry, Reeves & Wagner, LLP

(57) ABSTRACT

The present disclosure pertains generally to cutting belts, in particular cutting belts having a cable. In certain aspects, this disclosure provides new cutting segments and cable arrangements for cutting belts. In some embodiments, the cutting belt has cable arrangements that resist rotation when under tension. Cutting belts having cable segments positioned radially outward of other cable segments, relative to the central opening of the cutting belt, around at least 60% of the length of the cutting belt, and cutting belts having cable segments with different twist directions are disclosed.

20 Claims, 5 Drawing Sheets

(56) References Cited

U.S. PATENT DOCUMENTS

| | | | |
|---|---|---|---|
| 4,945,899 A | | 8/1990 | Sugiyama et al. |
| 5,181,503 A | * | 1/1993 | Fish ................... B23D 59/04 |
| | | | 125/21 |
| 5,603,311 A | | 2/1997 | Hoerner et al. |
| 5,735,259 A | * | 4/1998 | Hoerner ............... B27B 17/025 |
| | | | 125/21 |
| 5,749,775 A | * | 5/1998 | Fish ................... B28D 1/124 |
| | | | 125/21 |
| 5,918,586 A | | 7/1999 | Dungen et al. |
| 6,021,773 A | * | 2/2000 | Svensson ........... B23D 57/0015 |
| | | | 125/18 |
| 6,112,739 A | * | 9/2000 | Hoerner ............... B27B 17/025 |
| | | | 125/21 |
| 6,119,674 A | | 9/2000 | Eriksson et al. |
| 9,796,114 B2 | * | 10/2017 | Bennett ................. B23D 59/04 |
| 2003/0171181 A1 | * | 9/2003 | Sedlacek ................. F16G 1/10 |
| | | | 474/263 |
| 2008/0172605 A1 | * | 7/2008 | Smith ................... G06T 19/20 |
| | | | 715/243 |
| 2012/0138040 A1 | * | 6/2012 | Barnes ................ B23D 61/185 |
| | | | 125/21 |
| 2016/0185011 A1 | | 6/2016 | Hall et al. |

\* cited by examiner

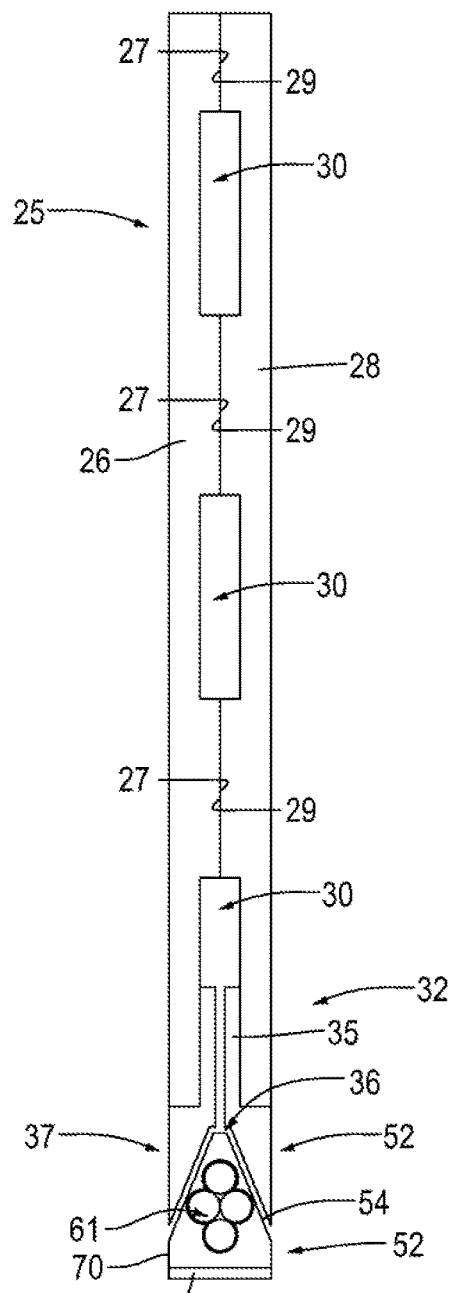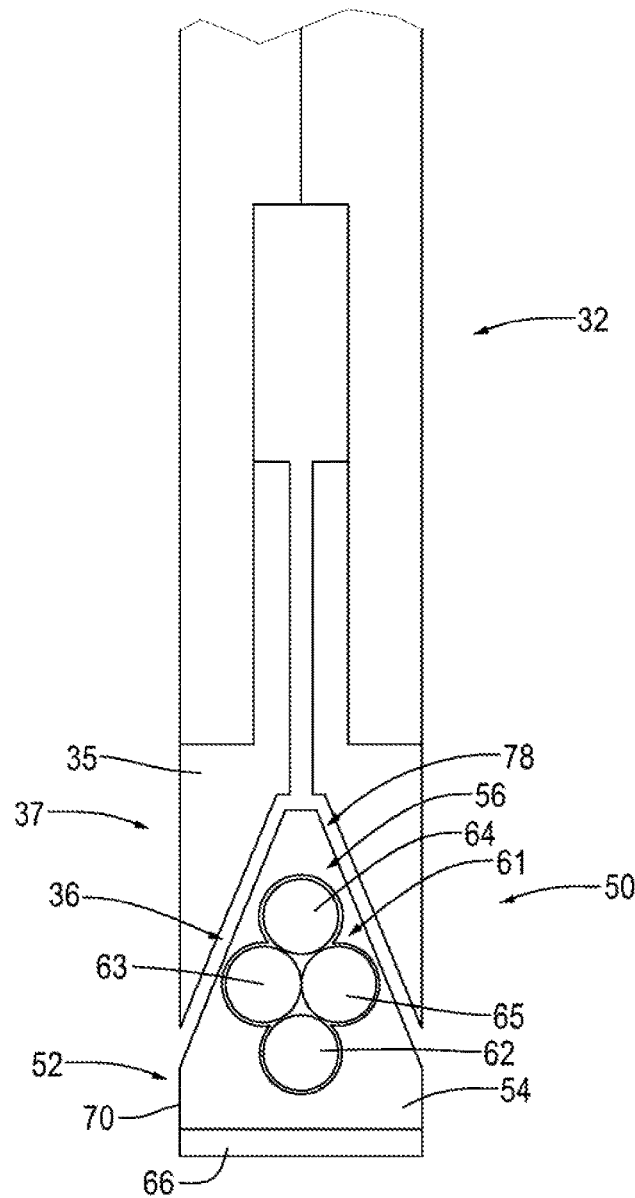
*Fig. 3*
*Fig. 4*

CUTTING BELT WITH A PLURALITY OF CABLE SEGMENTS

FIELD OF THE DISCLOSURE

The present disclosure pertains generally to the field of cutting equipment, in particular cutting belts. In certain aspects, the present disclosure provides improvements to existing cutting belt designs.

BACKGROUND

Applicant has extensive experience in the cutting equipment industry. Applicant's business has supplied tools to the stone cutting industry for over 125 years, and Applicant also holds several patents on saws for cutting stone. For example, Applicant's U.S. Pat. No. 5,181,503 to Fish discloses a stone slab saw having a continuous flexible belt drivingly mounted to a plurality of sheaves rotatably mounted to a frame that is vertically movable by a pair of racks and pinions driven by a motor so that the belt can be moved vertically downward through a stone block during a cutting operation. The belt includes a pair of continuous cables that extend through metal mounting blocks with the cables providing continuous flexible elongated members extending through the belt and the mounting blocks providing strength to the belt.

To keep the belt cutting in a straight line, a one-piece guide bar is mounted to the frame to support the belt. That bar provides a rigid backing for the saw belt as it is driven and while it cuts through a block of stone. During a cutting operation, a lubricant is emitted through passageways in the guide bar.

Another of Applicant's patents, U.S. Pat. No. 4,945,889 to Fish, illustrates a stone cutting belt having a flexible and continuous main body. The belt includes a plurality of cutter segments, each comprising a preferably metallic drive block and a metallic carrier block mounted on the top surface of the drive block. Continuous cables extend along the entire length of the belt and through openings in the plurality of drive blocks. The main body is of a resilient material in which the cutter segments and cables are embedded in an injection molding process.

While these devices are suitable for cutting, improvements are desired.

SUMMARY

The present disclosure pertains generally to the field of cutting equipment, in particular cutting belts. In certain aspects, the present disclosure provides improvements to existing cutting belt designs including cutting belts for narrow belt block saws.

Applicant observed that cutting belts, such as block saw narrow belts, may twist when under heavy cutting loads or high tension. Applicant further observed that cutting belts that are twisted during a cutting operation are less effective. Existing cutting belts such as block saw narrow belts include a single cable having seven wire-strands that extends along the closed-circumference belt through a series of cutting segments and is embedded in plastic. Applicant believes the twisting in the overall belt that occurs during heavy cutting loads and high tension is due to the twist of the strands in the cable extending through the belt. Specifically, Applicant believes that as the cable is put under high tension, the strands of the cable desire to untwist, creating a rotational force in the cutting belt.

To solve this problem, Applicant has designed improvements to the belt; in particular, improvements to the cutting segments and cable arrangement. Cutting belts disclosed herein can have a plurality of cutting segments that are spaced along the length of the cutting belt and connected by cable segments. Each cutting segment may include a diamond impregnated cutting member attached to a mounting member. The mounting member includes one or more openings through which one or more cable segments may be inserted.

In some embodiments, the mounting members include an opening having a plurality of recesses configured to receive cable segments. In some instances, each recess is configured to receive a respective cable segment. In some embodiments, there may be four interconnected recesses that are arranged in a quatrefoil (e.g., clover leaf) pattern; however, other embodiments may include different numbers of recesses and/or may include different arrangements of recesses.

In some instances the openings are offset from the centroid of the cutting segment. For example, the one or more openings of the cutting segment may be positioned lateral to a vertical axis extending through the centroid of the cutting segment. Additionally or alternatively, one or more openings of the cutting segment may be positioned above or below a horizontal axis extending through the centroid of the cutting segment. In arrangements having multiple openings, openings may be positioned on opposing sides of the vertical axis and/or horizontal axis. Similarly, in arrangements having an opening with a plurality of recesses, the recesses may be positioned on opposing sides of the vertical axis and/or horizontal axis.

In some instances, the recesses are arranged to position one or more cable segments radially outward of another cable segment relative to the central opening of the cutting belt. For example, the recesses may be arranged to position a first cable segment radially outward of a second cable segment along a majority of the circumferential length of the cutting belt. In some instances, a first cable segment may be positioned radially outward of a second cable segment, relative to a central opening defined by the closed loop cutting belt, along at least 60% of the length of the main body.

The cutting belt includes one or more cable segments that are continuous along the length of the cutting belt and may be used to support and increase the strength of the belt. The one or more cable segments can be formed by one or more cables. In some instances, the one or more cable segments can include cable segments having different twist directions. Advantageously, in such instances, the rotational force (i.e., moment) generated by one cable segment under tension is cancelled out by the opposing rotation force of the oppositely-twisted cable segment.

The one or more cable segments each included a plurality of strands. For example, a cable segment may be a seven-strand, wire cable formed with six strands of wire wrapped around a center strand of wire. As will be appreciated by those of ordinary skill in the art, cable segments of any number of strands may be used. Additionally, cable segments having "strands" of smaller cables are contemplated.

In many arrangements, the assembled cutting segments and cable segments are embedded in a resilient material to form a resilient body that spans the length of the belt. In certain aspects, the present disclosure provides a cutting belt, comprising: a main body having a length that defines a closed loop; the main body including a plurality of cable segments extending between cutting segments spaced along the length of the main body; the plurality of cable segments including a first cable segment and a second cable segment; and wherein the first cable segment is positioned radially outward of the second cable segment, relative to a central opening defined by the closed loop, along at least 60% of the length of the main body.

In some instances, the first cable segment is positioned radially outward of the second cable segment, relative to a central opening defined by the closed loop. For example, the first cable segment may be positioned radially outward of the second cable segment, relative to the central opening, along at least 60%, 70%, 80%, or 90% of the length of the main body.

Embodiments also can include at least one cable segment of the plurality of cable segments having strands twisted in a first direction and another cable segment of the plurality of cable segments having strands twisted in a second direction, the second direction being opposite the first direction. In some instances, cable segments of the plurality of cable segments have different diameters and/or different twist rates.

The present disclosure also provides cutting belts, comprising: a plurality of cable segments including a first cable segment and a second cable segment; a plurality of cutting segments positioned on the plurality of cable segments; wherein the first cable segment has strands twisted in a first direction; wherein the second cable segment has strands twisted in a second direction; wherein the first direction and the second direction are opposite one another.

The first cable segment may have a first cable having a first end coupled to a second end so as to form the first cable into a closed loop; and the second cable segment may have a second cable having a first end coupled to a second end so as to form the second cable into a closed loop. In some arrangements, the first end of the first cable is spliced into the second end of the first cable; and the first end of the second cable is spliced into the second end of the second cable.

In several embodiments, the first and second cable segments extend through an opening in at least one cutting segment; wherein the opening includes a first recess for the first cable segment and a second recess for the second cable segment, the first recess having a wall portion extending around at least 180° the first cable segment and the second recess having a wall portion extending around at least 180° the second cable segment; and wherein the wall portion of the first recess is separate from the wall portion of the second recess.

Applicant also envisions cutting belts, comprising: a cable having twisted strands, a first end, a second end, and a length; a plurality of cutting segments spaced along the length of the cable and coupled thereto; wherein the first end is coupled to the second end to define a closed loop; and wherein the cable is a rotation resistant or non-rotating cable when under tension. The cable can include a plurality of wire strands twisted in a first direction and a plurality of wire strands twisted in a second direction, the second direction being opposite the first direction.

In any of the disclosed embodiments, the cable and/or cable segment may include metal strands (e.g., strands of metal wire). Additionally or alternatively, in some arrangements, portions of the cable segments positioned between adjacent cutting segments are encased in plastic, the plastic providing an edge-free outer surface along a length of the cutting belt having at least three cutting segments.

Embodiments disclosed herein include cutting belts comprising a main body having a length that defines a closed loop; the main body including a plurality of cable segments extending between cutting segments spaced along the length of the main body; the plurality of cable segments including a first cable segment of a first cable formed into a closed loop and a second cable segment of a second cable formed into a closed loop; and wherein the first and second cable segments extend through a first opening in at least one cutting segment.

As used in the claims and the specification, the term "cable" means a rope of metal or nonmetallic material strands or groups of strands twisted or braided together. The language used in the claims and the written description and in the above definition(s) is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

Further forms, objects, features, aspects, benefits, advantages, and embodiments of the present invention will become apparent from a detailed description and drawings provided herewith.

BRIEF DESCRIPTION OF THE DRAWINGS

FIG. 3 is a cross-sectional view along line 3-3 of FIG. 1.

FIG. 4 is a close-up view of the bottom portion of FIG. 3.

DESCRIPTION OF THE SELECTED EMBODIMENTS

Figure 1:
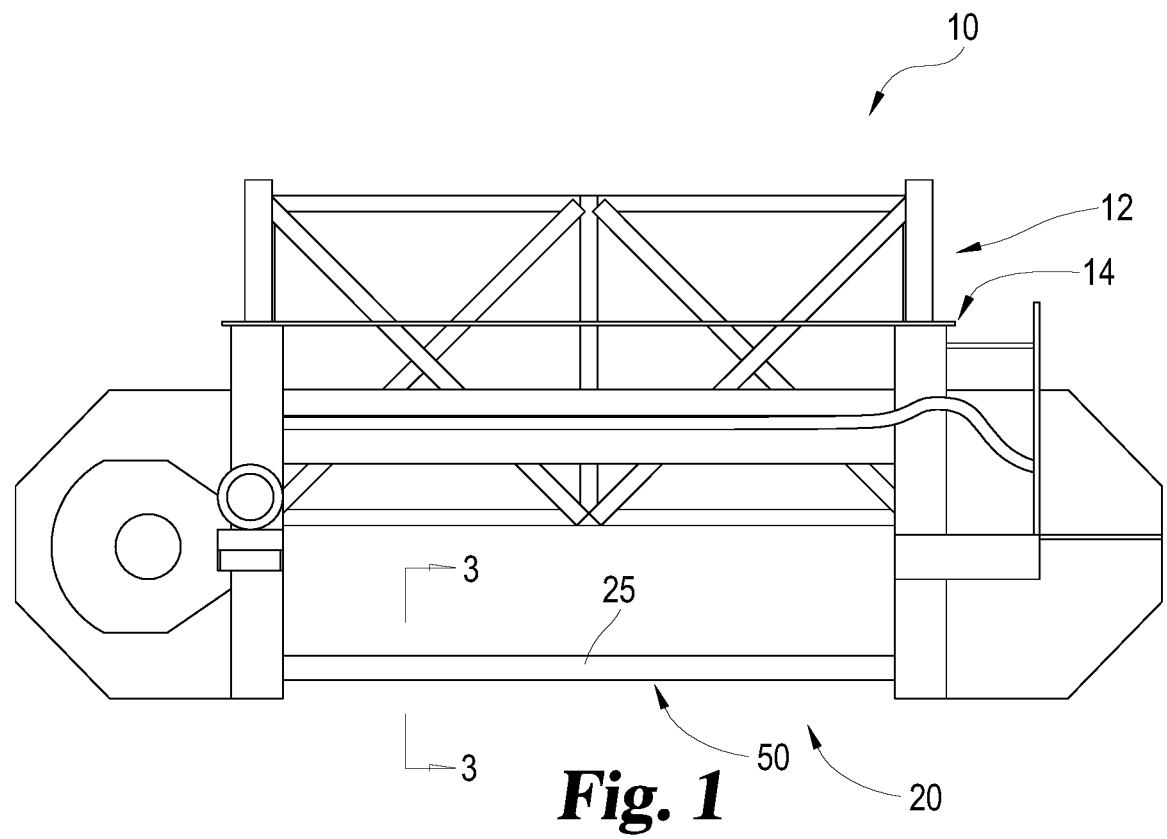
FIG. 1 is a front elevational view of a belt saw.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates a front elevational view of an exemplary belt saw 10. Belt saw 10 generally comprises a gantry saw frame 12 and a cutting frame 14. Cutting frame 14 supports a guide bar system 20, including a guide bar 25, and is movable relative to the gantry saw frame 12. During operation of belt saw 10, a stone block is positioned beneath the guide bar system 20 of cutting frame 14, and cutting frame 14 travels along a downward direction into the stone block as a flexible cutting belt 50 (shown in FIGS. 3-5 and 7) travels along the guide bar system 20 to cut the stone block. After the cutting operation is complete, cutting frame 14 may be moved along a vertical direction so as to remove guide bar system 20 from the stone block and/or to prepare for a subsequent cut.

Figure 2:
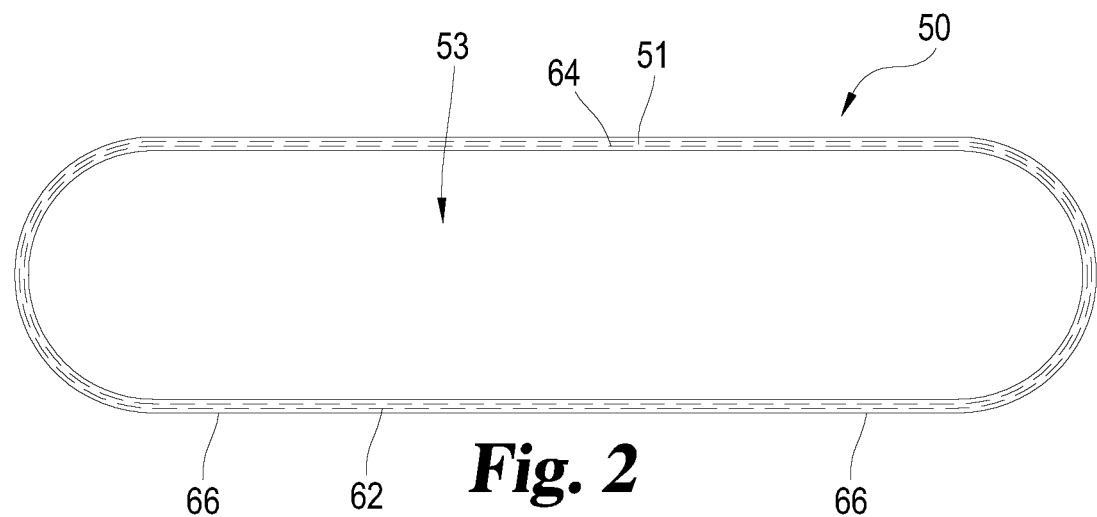
FIG. 2 is a front elevational view of a cutting belt used in the belt saw of FIG. 1.

FIG. 2 illustrates a cutting belt suitable for use in the belt saw 10 of FIG. 1. Cutting belt 50 has a main body 51 forming a closed loop which defines a central opening 53.

A cross-sectional view of an embodiment of a guide bar 25 of the guide bar system 20 is shown in FIG. 3. Guide bar 25 comprises a first sheet 26 having a first contact surface 27 and a second sheet 28 having a second contact surface 29. First and second sheets 26, 28 contact one another along the first and second contacting surfaces 27, 29. Grooves between the contacting surfaces 27, 29 define fluid channels 30. The fluid channels 30 extend along a length of guide bar 25 and are arranged to provide fluid through a wear strip 35 and into a cutting belt receiving recess 36 defined by a lower portion 37 of wear strip 35 to reduce friction and wear between the cutting belt 50 and the wear strip 35.

Figure 5:
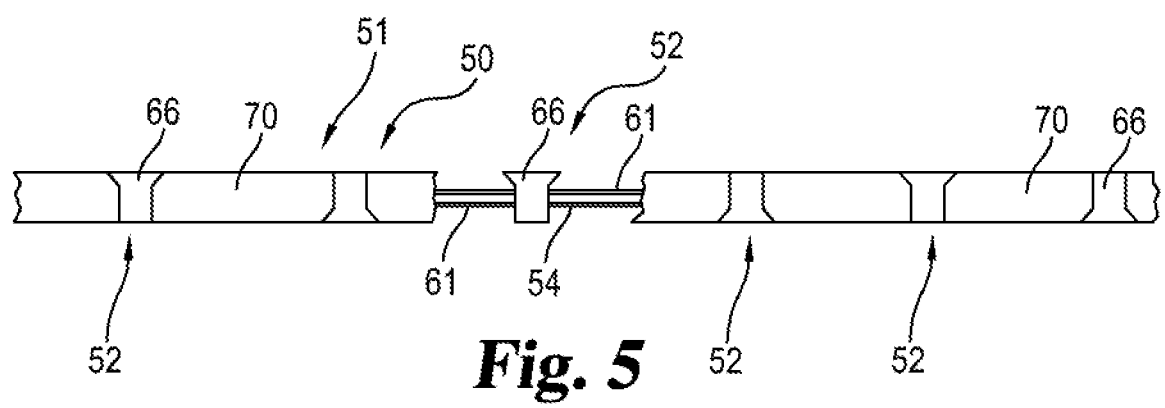
FIG. 5 is a bottom view of a portion of the cutting belt of the belt saw of FIG. 1.

The belt 50 includes a plurality of cutting segments 52 along its length (see FIG. 5). Each cutting segment 52 includes a mounting member 54 with a cutting member 66 mounted on a radially-outward facing surface of the mounting member 54, relative to the central opening defined by the closed-loop cutting belt, by suitable means. In the preferred embodiment, both the mounting member 54 and the cutting member 66 are composed of a metal, such as a mild steel suitable for investment casting. Cutting member 66 may be impregnated with a high strength material, such as diamond, for cutting through stone. The cutting member 66 is brazed onto the radially-outward facing surface 55 (see FIGS. 6 and 7) of mounting member 54.

Figure 6:
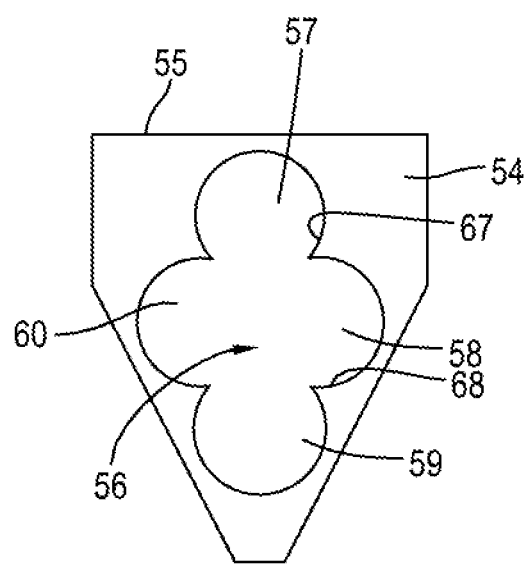
FIG. 6 is a side view of a mounting member of a cutting belt.

As shown in FIG. 6, mounting member 54 includes an opening 56 extending longitudinally through mounting member 54. Opening 56 is configured to receive a cable arrangement 61 of main body 51. For example, opening 56 includes interconnected recesses 57, 58, 59, and 60, arranged to receive cable segments 62, 63, 64, and 65 of cable arrangement 61.

Cable arrangement 61 is continuous through the length of main body 51. For example, cable segments 62, 63, 64, and 65 can be continuous through the length of the main body 51. In some instances, at least one of the cable segments is a cable having a first end coupled to a second end of the same cable so as to form the cable into a loop. Coupling of a first end of the cable and/or cable segment to a second end of the cable/cable segment may include splicing the first end into the second end.

Each of the cable segments 62, 63, 64, and 65 extends through a respective recess 57, 58, 59, and 60 in opening 56. In the embodiments shown, recesses 57, 58, 59, 60 define an oblong quatrefoil with a long axis aligned with the vertical axis of the cutting segment 52. Each of the recesses 57, 58, 59, 60 hold a respective individual cable segment 62, 63, 64, 65, so that four cable segments may be inserted through mounting member 54. It will be appreciated, however, that opening 56 and recesses 57, 58, 59, and 60 may be in any of a number of arrangements. For example, the recesses may define a trefoil or cinquefoil arrangement, just to name a few non-limiting examples. Additionally or alternatively, opening 56 and any recesses may be rotated relative to cutting segment 52. While recesses 57, 58, 59, and 60 are illustrated as being interconnected, it will be appreciated that recesses and/or openings of the cutting segment 52 may be separated by material of the mounting member so that the openings/recesses are not interconnected.

Recesses 57, 58, 59, 60, in many embodiments, have wall portions that extend around at least 180°, 200°, 220°, 240°, or 260° of the cable segments received therein. For instance, recess 57 has wall portion 67 that extends around at least 270° of cable segment 62 when the cable segment is received therein. Recess 58 has a wall portion 68 that extends around at least 240° of cable segment 63.

Figure 7:
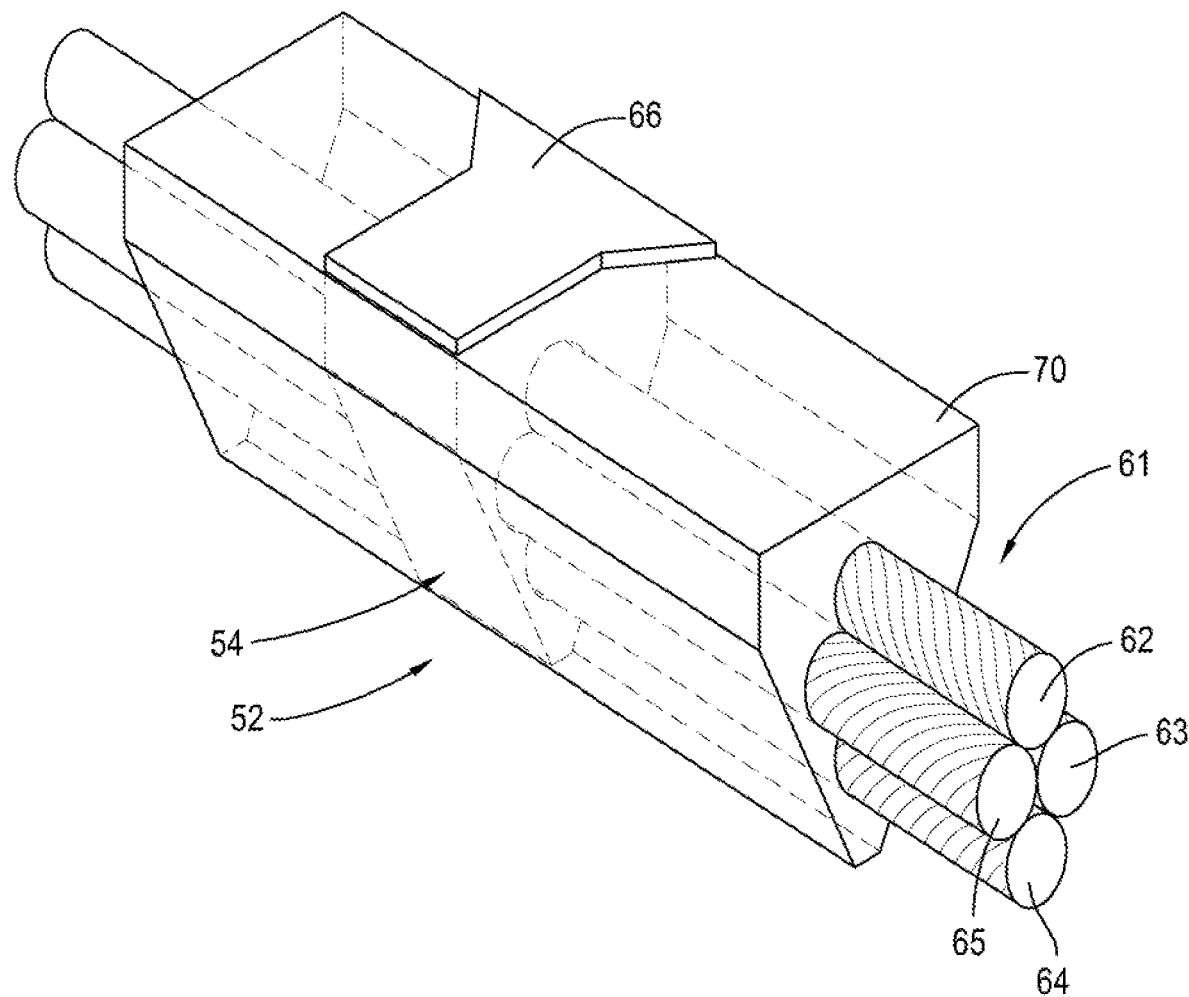
FIG. 7 is a perspective view of a segment of a cutting belt.

As shown in FIG. 7, the mounting member 54, cutting member 66, and cable arrangement 61 are embedded in a resilient body 70. Resilient body 70 can extend throughout the entire length of main body 51. In some embodiments, belt 50 is formed by placing the one or more cables and cable segments with cutting segments thereon in an injection mold, with the mold being at approximately 150° F. Polyurethane is then injected into the mold to encapsulate the one or more cable segments and/or cutting segments 52. During the injection molding process, the polyurethane may infiltrate opening arrangement 56 in mounting member 54 to surround cable arrangement 61 and securely anchor mounting member 54 to cable arrangement 61. In some instances, cutting segment 52 has an outward facing surface that is flush with an outer surface of resilient body 70.

In the embodiment shown, the cable segments 62, 63, 64, 65 may have different lengths along the circumference of belt 50. As an example, for the embodiment shown in FIG. 4, three different lengths of cable segments (e.g., cables) are needed. Inner cable segment 64, which is positioned radially inward of side cable segments 63, 65 and outer cable segment 62 relative to belt 50, has a shorter length than cable segments 63, 64, and 65. Side cable segments 63, 65 are positioned radially outward of inner cable segment 64 and radially inward of outer cable segment 62 and, therefore, are longer than inner cable segment 64 and shorter than outer cable segment 62. Side cable segments 63 and 65 can have equivalent lengths. Outer cable segment 62 is radially outward of side cable segments 63, 65, and, therefore, is longer than inner cable segment 64 and side cable segments 63, 65. As will be appreciated by those of ordinary skill in the art, the length of each of the cable segments 62, 63, 64, 65 may be adjusted depending on the positioning of the openings 57, 58, 59, 60, in the cutting segments so that each cable segment extends the entire length of belt 50.

Cable segments 62, 63, 64, 65 can be lengths of separate cables and/or can be separate segments of a continuous cable. For example, cable segments 62, 63, 64, and 65 can each be separate cables. Alternatively, cable segments 62 and 63 may be of a first continuous cable and cable segments 64 and 65 may be of a second continuous cable, just to name one non-limiting example.

Each of the cable segments 62, 63, 64, 65 includes multiple strands of material twisted together. As an example, the cable segments may each have a seven wire strand construction with six strands of wire positioned around a single wire strand. This multiple strand construction aids in the flexibility of cable segments 62, 63, 64, and 65.

In some embodiments, cable segments of the belt have different (e.g., opposing) twist directions. The twist directions of each of the cable segments 62, 63, 64, 65 through each of the openings 57, 58, 59, 60 may be arranged to reduce or prevent the cable segments, when under tension, from rotating the orientation of belt 50 relative to the wear strip. For example, the twist directions of the cable segments may be arranged so that a rotational force generated by one cable segment is reduced by the rotational force generated by another cable segment when the cutting belt is under tension. For example, side cable segments 63 and 65 may have opposing twist directions. Additionally or alternatively, cable segment 62 positioned in the outer opening 57 may be wound so that its strands twist in a direction opposite that of cable segment 64 in inner opening 59. As illustrated in FIG. 7, cable segment 62 has strands twisting in a clockwise direction, and cable segment 64 has strands twisting in counterclockwise direction. In such arrangements, the rotational force from a first cable segment twisted in a first direction is reduced by a rotational force from a second cable segment twisted in a second direction when the first and second cable segments are under tension. As a further example, cable segments 62, 63 in the outer opening 57 and side opening 58, respectively, may be twisted clockwise while the cable segments 64, 65 in the inner opening 59 and side opening 60 may be twisted counterclockwise.

The cable segments may have the same or different numbers of strands and/or the same or different twist rates of the strands. For example, one or more cable segments may have seven strands (e.g., six strands twisted around a central strand), and other cable segments may have more, fewer, or the same number of strands. The twist rate can be measured when the cable segment is positioned in a linear, unstressed configuration. The twist rate can be the number of rotations a strand makes about a central axis of the cable segment along a defined length (e.g., about one rotation per inch of the cable). For example, some ¼" diameter seven-strand wire cables have a twist rate of eight rotations per thirteen inches of cable. In some embodiments, one or more cable segments 62, 63, 64, 65 may be ⅛" diameter seven-strand wire cables having a twist rate of eight rotations along seven inches of the cable segment. As further examples, Applicant envisions inner cable segment 64 and outer cable segment 62 having different numbers of strands (e.g., inner cable segment having fewer strands than outer cable segment) and/or inner cable segment 64 and outer cable segment 62 having different twist rates (e.g., the strands of inner cable segment 64 having a higher twist rate than the strands of outer cable segment 62).

The cable segments may have the same or different diameters. The diameter and twist rate can be measured when the cable segment is positioned in a linear, unstressed configuration In some embodiments, the diameters of the cable segments 62, 63, 64, 65 may be varied, such as the inner cable segment 64 having a diameter different than that of outer cable segment 62. Additionally or alternatively, one or more of inner and outer cable segments 62, 64 may have a larger or a smaller diameter than one or more side cable segments 63, 65.

Figure 8:
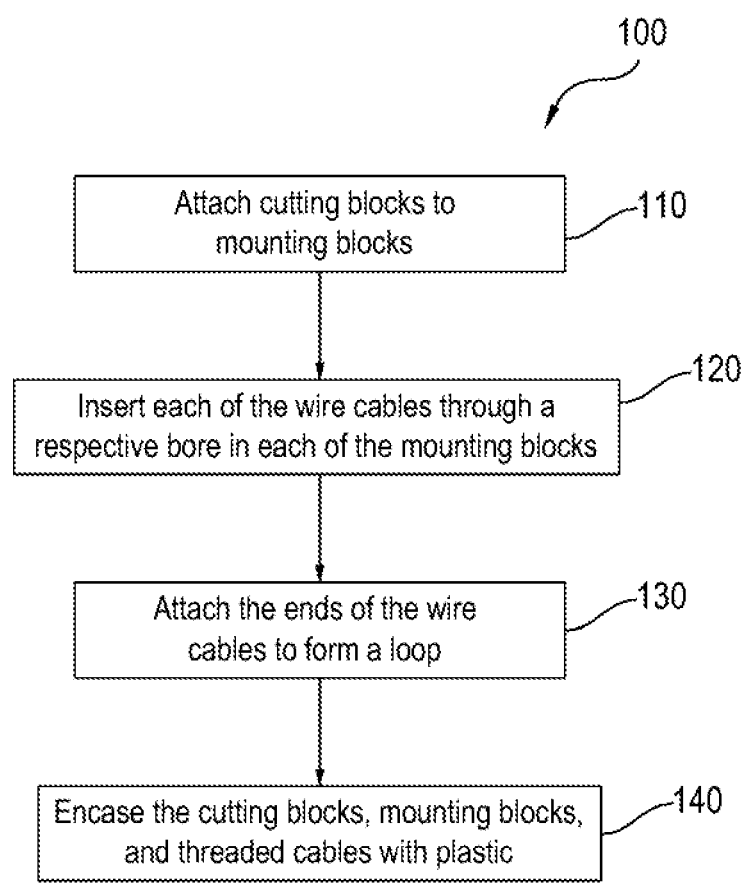
FIG. 8 is a flowchart for a method of assembling a belt for the belt saw of FIG. 1.

A method for assembling a belt 50 of a belt saw 10 is shown in the flowchart 100 of FIG. 8. In a first stage 110, cutting members are attached to respective mounting members. As an example, a cutting member may be attached to a mounting member by brazing. This process is repeated for all or a portion of the cutting segments desired in the belt. In a second stage 120, cable segments are inserted through respective opening(s)/recesses in each of the mounting members. For example, the inner cable segment is threaded through the inner recess of each of the mounting members, and the outer cable segment is threaded through the outer recess of each of the mounting members.

In a third stage 130, the ends of the one or more cables forming the cable segments are attached to one another to form the one or more cables into one or more closed loops. The one or more closed loops define the circular or oval shape for the cutting belt. In a fourth stage 140, the one or more looped cables are encased in a protective plastic. Portions of the cutting segments (e.g., the mounting members) may also be encased in the protective plastic.

As will be appreciated by one skilled in the art, one or more of the stages described above may be performed simultaneously and/or in an order different than that provided above. For example, the second stage 120 and/or third stage 130 may occur prior to the first stage 110.

The following numbered clauses set out specific embodiments that may be useful in understanding the present invention:

1. A cutting belt, comprising:
    a main body having a length that defines a closed loop;
    the main body including a plurality of cable segments extending between cutting segments spaced along the length of the main body;
    the plurality of cable segments including a first cable segment and a second cable segment; and
    wherein the first cable segment is positioned radially outward of the second cable segment, relative to a central opening defined by the closed loop.

2. The cutting belt of clause 1, wherein:
    the first cable segment is positioned radially outward of the second cable segment, relative to a central opening defined by the closed loop, along at least 70% of the length of the main body.

3. The cutting belt of any preceding clause, wherein:
    the first cable segment is positioned radially outward of the second cable segment, relative to a central opening defined by the closed loop, along at least 80% of the length of the main body.

4. The cutting belt of any preceding clause, wherein:
    the first cable segment is positioned radially outward of the second cable segment, relative to a central opening defined by the closed loop, along at least 90% of the length of the main body.

5. The cutting belt of any preceding clause, wherein:
    the first cable segment is a first cable having a first end coupled to a second end so as to form the first cable into a closed loop; and
    wherein the second cable segment is a second cable having a first end coupled to a second end so as to form the second cable into a closed loop.

6. The cutting belt of clause 5, wherein:
    the first end of the first cable is spliced into the second end of the first cable; and wherein the first end of the second cable is spliced into the second end of the second cable.

7. The cutting belt of any preceding clause, wherein:
    the first and second cable segments extend through an opening in at least one cutting segment;
    wherein the opening includes a first recess for the first cable segment and a second recess for the second cable segment, the first recess having a wall portion extending around at least 180° the first cable segment and the second recess having a wall portion extending around at least 180° the second cable segment; and
    wherein the wall portion of the first recess is separate from the wall portion of the second recess.

8. The cutting belt of any preceding clause, wherein:
    at least one cable segment of the plurality of cable segments has strands twisted in a first direction and another cable segment of the plurality of cable segments has strands twisted in a second direction, the second direction being opposite the first direction.

9. The cutting belt of any preceding clause, wherein:
    cable segments of the plurality of cable segments have different diameters and/or different twist rates.

10. A cutting belt, comprising:
    a plurality of cable segments including a first cable segment and a second cable segment;
    a plurality of cutting segments positioned on the plurality of cable segments;
    wherein the first cable segment has strands twisted in a first direction;

wherein the second cable segment has strands twisted in a second direction; and wherein the first direction and the second direction are opposite one another.

11. The cutting belt of clause 10, wherein:

the first cable segment is a first cable having a first end coupled to a second end so as to form the first cable into a closed loop; and wherein the second cable segment is a second cable having a first end coupled to a second end so as to form the second cable into a closed loop.

12. The cutting belt of clause 11, wherein:

the first end of the first cable is spliced into the second end of the first cable; and wherein the first end of the second cable is spliced into the second end of the second cable.

13. The cutting belt of any one of clauses 10-12, wherein:

the plurality of cables extend through an opening in at least one cutting segment.

14. The cutting belt of clause 13, wherein:

the opening includes a first recess for the first cable segment and a second recess for the second cable segment; and wherein the first recess for the first cable segment has a wall portion extending around at least 180° of the first cable segment and the second recess for the second cable segment has a wall portion extending around at least 180° of the second cable segment.

15. The cutting belt of any one of the above clauses, wherein:

portions of the plurality of cable segments positioned between adjacent cutting segments are encased in plastic, the plastic providing an edge-free outer surface along a length of the cutting belt having at least three cutting segments.

16. A cutting belt, comprising:

a cable having twisted strands, a first end, a second end, and a length;

a plurality of cutting segments spaced along the length of the cable and coupled thereto;

wherein the first end is coupled to the second end to define a closed loop; and wherein the cable is a rotation resistant or non-rotating cable when under tension.

17. The cutting belt of clause 16, wherein:

the cable includes a plurality of wire strands twisted in a first direction and a plurality of wire strands twisted in a second direction, the second direction being opposite the first direction.

18. The cutting belt of any one of clauses 16-17, wherein:

a portion of the cable positioned between adjacent cutting segments is encased in plastic, the plastic providing an edge-free outer surface along a length of the cutting belt having at least three cutting segments.

19. The cutting belt of any preceding clause, wherein:

the cable includes metal strands.

20. A cutting belt, comprising:

a main body having a length that defines a closed loop;

the main body including a plurality of cable segments extending between cutting segments spaced along the length of the main body;

the plurality of cable segments including a first cable segment of a first cable formed into a closed loop and a second cable segment of a second cable formed into a closed loop; and wherein the first and second cable segments extend through a first opening in at least one cutting segment.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A cutting belt, comprising:
a main body having a length that defines a closed loop;
the main body including a plurality of cable segments extending between cutting segments spaced along the length of the main body;
the plurality of cable segments including a first cable segment and a second cable segment; and
wherein the first cable segment is positioned radially outward of the second cable segment, relative to a central opening defined by the closed loop; and
wherein the first cable segment is positioned radially outward of the second cable segment, relative to the central opening defined by the closed loop, along at least 70% of the length of the main body; and
wherein the first and second cable segments extend through an opening in at least one cutting segment.

2. The cutting belt of claim 1, wherein:
the first cable segment is positioned radially outward of the second cable segment, relative to the central opening defined by the closed loop, along at least 80% of the length of the main body.

3. The cutting belt of claim 1, wherein:
the first cable segment is positioned radially outward of the second cable segment, relative to the central opening defined by the closed loop, along at least 90% of the length of the main body.

4. The cutting belt of claim 1, wherein:
the first cable segment is a first cable having a first end coupled to a second end so as to form the first cable into a closed loop; and
wherein the second cable segment is a second cable having a first end coupled to a second end so as to form the second cable into a closed loop.

5. The cutting belt of claim 4, wherein:
the first end of the first cable is spliced into the second end of the first cable; and
wherein the first end of the second cable is spliced into the second end of the second cable.

6. The cutting belt of claim 1, wherein:
wherein the opening includes a first recess for the first cable segment and a second recess for the second cable segment, the first recess having a wall portion extending around at least 180° the first cable segment and the second recess having a wall portion extending around at least 180° the second cable segment; and
wherein the wall portion of the first recess is separate from the wall portion of the second recess.

7. The cutting belt of claim 1, wherein:
at least one cable segment of the plurality of cable segments has strands twisted in a first direction and another cable segment of the plurality of cable segments has strands twisted in a second direction, the second direction being opposite the first direction.

8. The cutting belt of claim 1, wherein:
cable segments of the plurality of cable segments have different diameters and/or different twist rates.

9. A cutting belt, comprising:
a plurality of cable segments including a first cable segment and a second cable segment;
a plurality of cutting segments positioned on the plurality of cable segments;
wherein the first cable segment defines a first loop and the second cable segment defines a second loop;
wherein the first loop includes a first perimeter length and the second loop includes a second perimeter length;
wherein the first perimeter length of the first loop is shorter than the second perimeter length of the second loop;
wherein the first cable segment has strands twisted in a first direction;
wherein the second cable segment has strands twisted in a second direction; and
wherein the first direction and the second direction are opposite one another;
wherein the first and second cable segments extend through an opening in at least one cutting segment.

10. The cutting belt of claim 9, wherein:
the first end of the first cable is spliced into the second end of the first cable; and
wherein the first end of the second cable is spliced into the second end of the second cable.

11. The cutting belt of claim 9, wherein:
the plurality of cables extend through an opening in at least one cutting segment.

12. The cutting belt of claim 11, wherein:
the opening includes a first recess for the first cable segment and a second recess for the second cable segment; and
wherein the first recess for the first cable segment has a wall portion extending around at least 180° of the first cable segment and the second recess for the second cable segment has a wall portion extending around at least 180° of the second cable segment.

13. The cutting belt of claim 9, wherein:
portions of the plurality of cable segments positioned between adjacent cutting segments are encased in plastic, the plastic providing an edge-free outer surface along a length of the cutting belt having at least three cutting segments.

14. A cutting belt, comprising:
a main body having a length that defines a closed loop;
the main body including a plurality of cable segments extending between cutting segments spaced along the length of the main body;
the plurality of cable segments including a first cable segment of a first cable formed into a first cable segment closed loop and a second cable segment of a second cable formed into a second cable segment closed loop;
wherein the first cable segment closed loop includes a first perimeter length and the second cable segment closed loop includes a second perimeter length;
wherein the first perimeter length of the first cable segment closed loop is shorter than the second perimeter length of the second cable segment closed loop; and
wherein the first and second cable segments extend through a first opening in at least one cutting segment.

15. The cutting belt of claim 1, further comprising:
a third cable segment and a fourth cable segment;
wherein the third cable segment and the fourth cable segment are positioned radially outward of the second cable segment, relative to the central opening defined by the closed loop, along at least 70% of the length of the main body; and
wherein the third cable segment and the fourth cable segment are positioned radially inward of the first cable segment, relative to the central opening defined by the closed loop, along at least 70% of the length of the main body.

16. The cutting belt of claim 15,
wherein the first cable segment has strands and the second cable segment has strands and wherein the strands of the first cable segment are twisted in an opposite direction as the strands of the second cable segment; and
wherein the third cable segment has strands and the fourth cable segment has strands and wherein the strands of the third cable segment are twisted in an opposite direction as the strands of the fourth cable segment.

17. The cutting belt of claim 9, further comprising
a third cable segment and a fourth cable segment;
wherein the third cable segment defines a third loop and the fourth cable segment defines a fourth loop;
wherein the third loop includes a third perimeter length and the fourth loop includes a fourth perimeter length and wherein the third perimeter length is equal to the fourth perimeter length;
wherein the third perimeter length and the fourth perimeter length are each longer than the first perimeter length of the first loop; and
wherein the third perimeter length and the fourth perimeter length are each shorter than the second perimeter length of the second loop.

18. The cutting belt of claim 17,
wherein the third cable segment has strands twisted in a third direction;
wherein the fourth cable segment has strands twisted in a fourth direction;
wherein the third direction and the fourth direction are opposite one another.

19. The cutting belt of claim 14, further comprising,
a third cable segment of a third cable formed into a third cable segment closed loop;
a fourth cable segment of a fourth cable formed into a fourth cable segment closed loop;
wherein the third cable segment closed loop includes a third perimeter length and the fourth cable segment closed loop includes a fourth perimeter length and wherein the third perimeter length is equal to the fourth perimeter length;
wherein the third perimeter length and the fourth perimeter length are each longer than the first perimeter length of the first cable segment closed loop; and
wherein the third perimeter length and the fourth perimeter length are each shorter than the second perimeter length of the second cable segment closed loop.

20. The cutting belt of claim 19,
wherein the first cable segment has strands and the second cable segment has strands and wherein the strands of the first cable segment are twisted in an opposite direction as the strands of the second cable segment; and
wherein the third cable segment has strands and the fourth cable segment has strands and wherein the strands of the third cable segment are twisted in an opposite direction as the strands of the fourth cable segment.

* * * * *